US006697363B1

(12) United States Patent
Carr

(10) Patent No.: US 6,697,363 B1
(45) Date of Patent: Feb. 24, 2004

(54) METHOD AND APPARATUS FOR LONGEST MATCHING PREFIX DETERMINATION IN A COMMUNICATION NETWORK

(75) Inventor: David W. Carr, Nepean (CA)

(73) Assignee: Alcatel Canada Inc., Kanata (CA)

( * ) Notice: Subject to any disclaimer, the term of this patent is extended or adjusted under 35 U.S.C. 154(b) by 711 days.

(21) Appl. No.: 09/606,859

(22) Filed: Jun. 28, 2000

(51) Int. Cl.[7] .............................................. H04L 12/56
(52) U.S. Cl. ...................... 370/389; 370/392; 370/401
(58) Field of Search ............................... 370/389, 392, 370/400, 401, 408

(56) References Cited

U.S. PATENT DOCUMENTS

| 6,011,795 A | * | 1/2000 | Varghese et al. ............ 370/392 |
| 6,014,659 A | * | 1/2000 | Wilkinson et al. ............. 707/3 |
| 6,192,051 B1 | * | 2/2001 | Lipman et al. ............. 370/389 |
| 6,396,842 B1 | * | 5/2002 | Rochberger ................. 370/408 |
| 6,590,898 B1 | * | 7/2003 | Uzun ......................... 370/401 |

FOREIGN PATENT DOCUMENTS

WO   WO 00/02347 A2 A3   1/2000

OTHER PUBLICATIONS

Masanori Uga and Kohei Shiomoto, "A Fast and Compact Longest Match Prefix Look–Up Method Using Pointer Cache for Very Long Network Address", Computer Communications and Networks, 1999. pp. 595–602, Eight International Conference on Boston, MA, USA Oct. 11–13, 1999 (1999–10–11), IEEE, Piscataway, N.J.
Scalable High Speed IP Routing Lookups, 1998.
Small Forwarding Tables for Fast Routing Lookups, Oct. 1997.
Scalable High Speed IP Routing Lookups, Oct. 1997.
Implementing a Dynamic Compressed Trie, May 10, 1998.

* cited by examiner

Primary Examiner—Chau Nguyen
Assistant Examiner—Christine Ng

(57) ABSTRACT

A method and apparatus for compressing the data associated with trie cuts (strides), and a method and apparatus for utilizing such compressed data to determine forwarding decisions for data packets in a communication network are presented. The compression technique presented generates a pair of bitmaps and a pair of base pointers for each set of compressed data. The bitmaps are compared with a portion of the address to ascertain whether the forwarding decision is determined within this portion of the trie. Forwarding decisions are stored in a leaf table that is accessed via a leaf table index. The leaf table index is generated by combining a leaf table offset generated from at least one of the bitmaps with a leaf table base pointer included in the stride block. Thus, if the forwarding decision is determined within the stride, the leaf table will be accessed via the leaf table index to retrieve the forwarding decision. If the forwarding decision is not completely determined within the stride, a branch table is used to determine the location of the subsequent stride to be processed. The branch table is accessed via a branch table index generated by combining the branch table base pointer of the stride with a branch table index generated from one or more of the bitmaps included in the stride block.

36 Claims, 13 Drawing Sheets

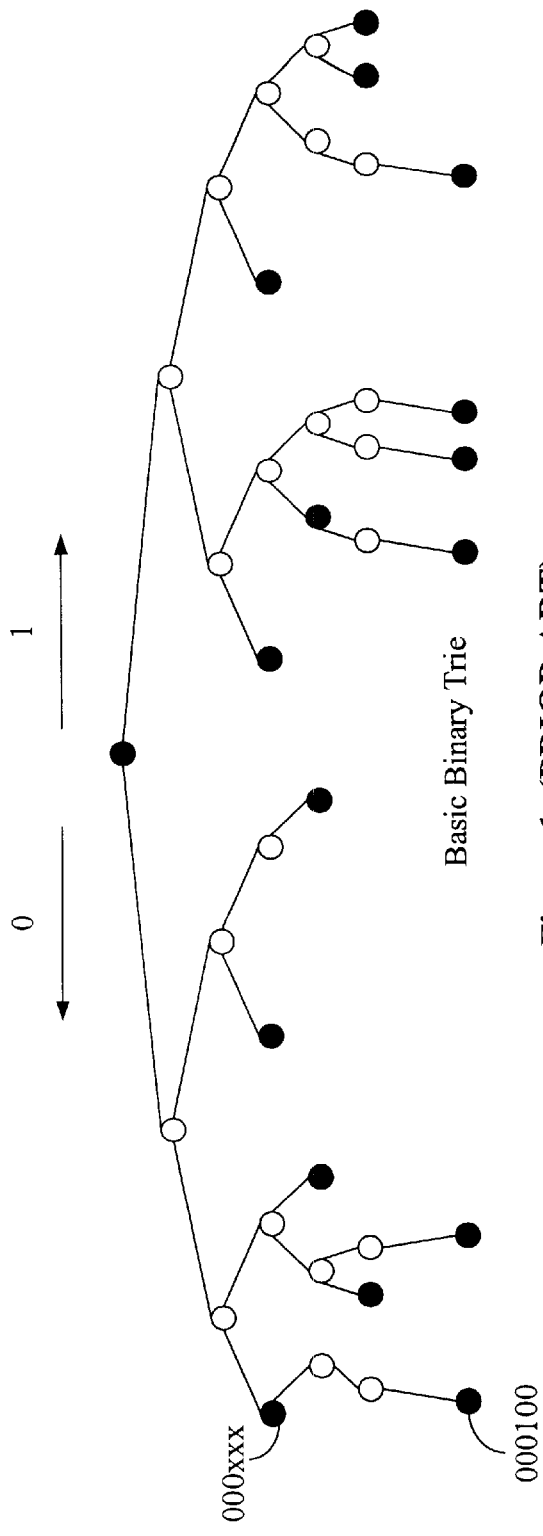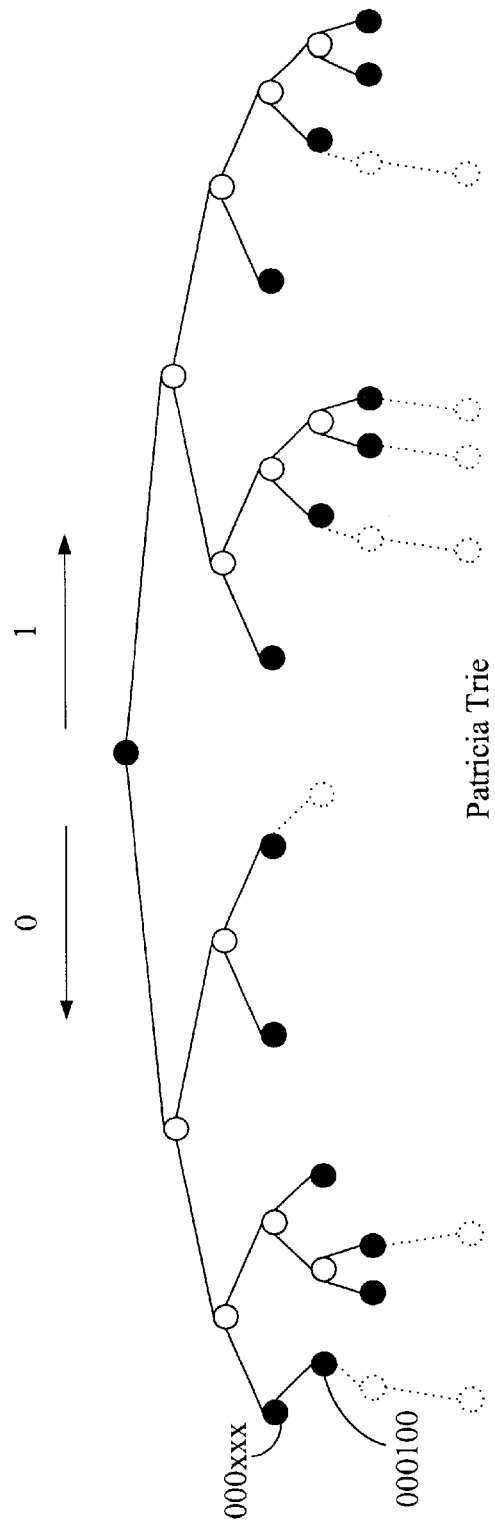
Figure 1. (PRIOR ART) Basic Binary Trie
Figure 2. (PRIOR ART) Patricia Trie

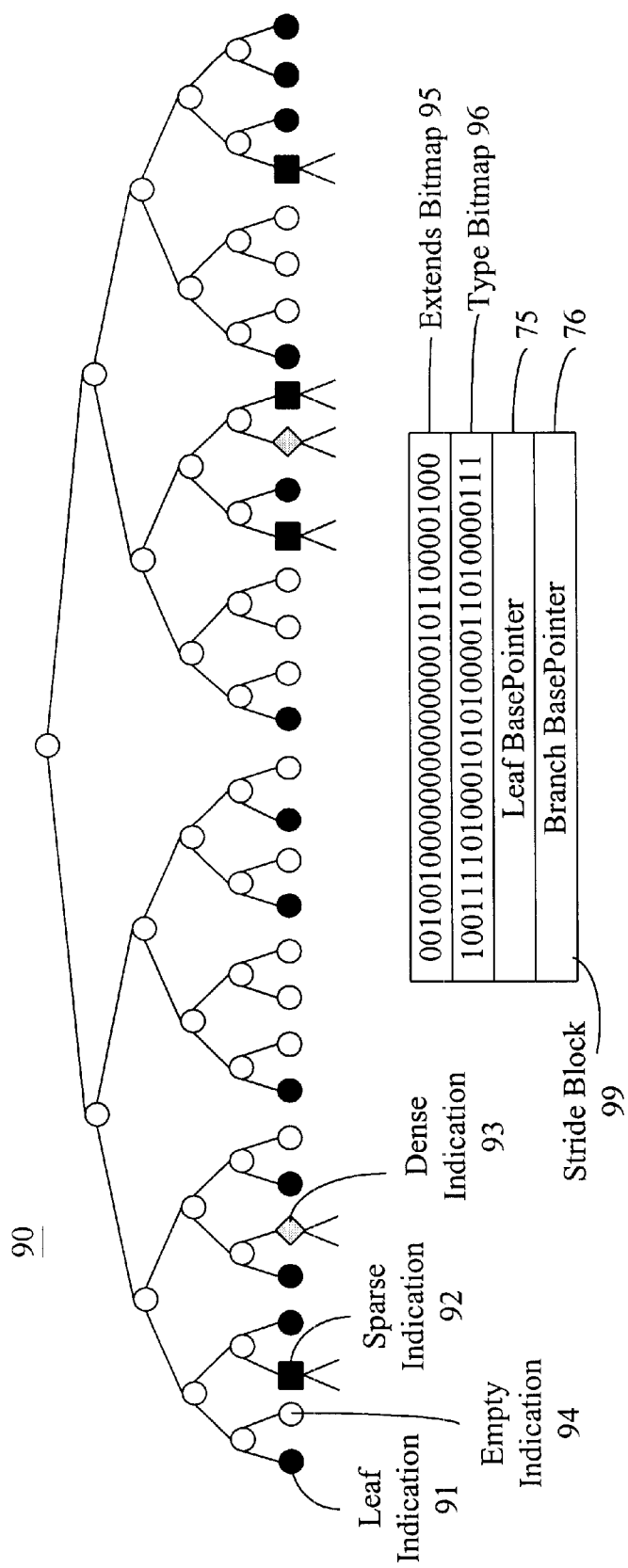
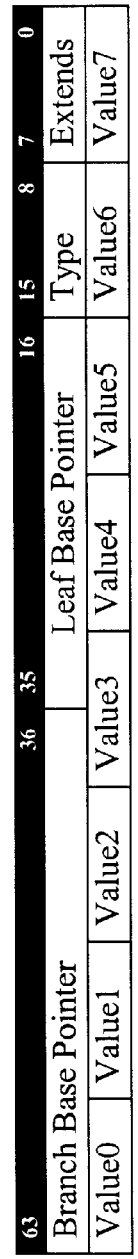
Figure 9.
Figure 10.

| 63 | 36 | 35 | 16 | 15 | 8 | 7 | 0 |
|---|---|---|---|---|---|---|---|
| Branch Base Pointer | | Leaf Base Pointer | | RFU | | Sparse | |
| Type Bitmap (32) | | | | Extends Bitmap (32) | | | |

| 256-bit Extends Bitmap |
|---|
| 256-bit Type Bitmap |

| Leaf Base Pointer | Branch Base Pointer |
|---|---|

METHOD AND APPARATUS FOR LONGEST MATCHING PREFIX DETERMINATION IN A COMMUNICATION NETWORK

FIELD OF THE INVENTION

The invention relates generally to communications networks and more particularly to a method and apparatus for longest matching prefix determination in communications networks.

BACKGROUND OF THE INVENTION

Data communications networks utilize addresses to forward packets of information between users. As data communication networks continue to evolve, the number of addresses supported, the amount of traffic, and the speed with which the traffic is traveling are all increasing. As such, routers in such communications networks must determine sources and destinations of endstations associated with traffic more quickly than in the past.

Routing data packets in Internet Protocol (IP) networks requires determining the best matching prefix corresponding to the source and destination addresses for the packet, which may also be referred to as determining a longest prefix match (LPM) for the addresses. Routers that forward packets typically include a database that stores a number of address prefixes and their associated forwarding decisions that indicate where the data should be sent next (next hops). When the router receives a packet it must determine which of the prefixes in the database is the best match for the packet.

Binary tries have commonly been used for determining the LPM for data packets. FIG. 1 illustrates a basic binary trie structure that includes a set of binary prefixes. The example trie illustrated in FIG. 1 corresponds to a six-bit address space that is used to simplify the discussion. The shaded circles indicate valid prefixes. The binary trie illustrated in FIG. 1 contains a default route corresponding to the root of the trie and a plurality of valid prefixes that may only be partially specified (e.g. 000XXX), or fully specified (e.g. 000100). Bits included in the address to be resolved are used to make branching decisions at each of the nodes within the trie, where 0 bits cause a branch to the left and one bits cause a branch to the right. As is illustrated, the binary prefix 000XXX is a valid prefix, as is the prefix 000100. Although a packet that has an address that matches the prefix 000100 would also match the valid prefix 000XXX, the longest matching prefix is 000100, and thus 000100 is the prefix which must be selected for the address.

FIG. 2 illustrates a prior art technique for simplifying the basic binary trie illustrated in FIG. 1. FIG. 2 illustrates a Patricia trie that flattens the basic binary trie in areas where decisions at nodes within the trie structure cannot result in more than one possible prefix determination. In other words, nodes within the trie structure that are traversed in route to a valid prefix with no further decision making required are compressed out. Such path compression can reduce the average number of memory accesses required to determine the LPM for an address to $\log_2 N$ accesses, where N is the number valid prefixes stored in the trie. However, in the worst case when a path cannot be compressed, Patricia trees may require L memory accesses to resolve an LPM, where L is equal to the number of bits in the address, which may be 32 bits in some applications such as IP version 4 and 128 bits for IP version 6. The variability in the number of memory accesses requires presents problems for high-speed router design. Furthermore, even if all LPM determinations could be made with $\log_2 N$ memory accesses, the memory bandwidth requirements would still make router design impractical when high link rates must be supported.

Another trie processing method that attempts to reduce the time it takes to determine the appropriate prefix is to create a multi-way branching trie that processes multiple bits of the address in a single step. This is illustrated in FIG. 3, where a trie that exists in a 32-bit address space has been broken into a set of steps, or strides. As is illustrated, the strides may be selected to be of varying bit lengths. Thus, 4-bit strides, 8-bit strides, and even 16-bit strides may be employed to traverse the trie structure. For each stride, a portion of the address is compared with sets of bits corresponding to that stride to determine if a LPM has been resolved or if one or more additional strides must be traversed in order to determine the LPM.

In order to be able to process a number of address bits in a stride, prefix expansion must be performed so that there is a valid prefix for each binary value at the cut depth for the stride, where the cut depth is determined by the size of the stride. FIG. 4 shows the root level of a 5-bit portion of a trie structure after prefix expansion. The cut depth is the bottom set of prefixes of the trie structure illustrated in FIG. 4 and is shown surrounded by a long rectangular box. In order to have valid prefixes at all of the nodes at the cut level, new nodes may have to be created at the cut depth in order to make the trie complete. Values for newly created nodes are then propagated from parent nodes. Propagation of a prefix value to a newly created node is illustrated via the arrows originating from parent nodes. One example is the labeled parent node that propagates a valid prefix to the three labeled propagated nodes. As can be seen, the highest level, or root node also serves as a parent node to some of the nodes at the cut level.

Those nodes in the trie structure of FIG. 4 that represent a final prefix match and a resolved forwarding decision are represented by a shaded circle, whereas those nodes that indicate the next stride must be accessed in order to continue towards determination of a forwarding decision are represented by shaded squares. Thus, shaded circles represent a point at which the search for prefix match is terminated, whereas shaded squares indicate that the prefix match must exist at a deeper level in the overall trie structure and therefore the search is extended.

Because $2^N$ valid prefixes are typically stored to process an N-bit stride, larger strides require a great deal of memory, which can be a limiting factor in the stride size chosen. Smaller strides require, on average, more memory accesses to ascertain the forwarding decisions. Thus, there is a trade-off between the amount of memory required to store the data for a trie structure and the number of memory accesses required to completely traverse the trie structure to the appropriate end prefix.

Therefore, a need exists for a method and apparatus that reduces the memory required to store values associated with strides in trie structures such that prefix matching can be performed using a minimal number of memory accesses.

BRIEF DESCRIPTION OF THE DRAWINGS

FIG. 1 illustrates a graphical representation of a prior art binary trie structure;

FIG. 2 illustrates a graphical representation of a prior art Patricia trie structure;

FIG. 9 illustrates a graphical representation of a trie cut with compressed nodes that distinguishes between subsequent dense and sparse stride records in accordance with a particular embodiment of the present invention;

FIG. 10 illustrates a graphical representation of a sparse stride record in accordance with a particular embodiment of the present invention;

FIG. 11 illustrates a graphical representation of a dense stride record in accordance with a particular embodiment of the present invention;

FIG. 12 illustrates a graphical representation of a dense block in accordance with a particular embodiment of the present invention;

DETAILED DESCRIPTION OF A PREFERRED EMBODIMENT OF THE INVENTION

Generally, the present invention provides a method and apparatus for compressing the data associated with trie cuts (strides), and a method and apparatus for utilizing such compressed data to determine forwarding decisions for data packets in a communication network. The compression technique presented generates a pair of bitmaps and a pair of base pointers for each set of compressed data. The bitmaps are compared with a portion of the address to ascertain whether the forwarding decision is determined within this portion of the trie. Forwarding decisions are stored in a leaf table that is accessed via a leaf table index. The leaf table index is generated by combining a leaf table offset generated from at least one of the bitmaps with a leaf table base pointer included in the stride record. Thus, if the forwarding decision is determined within the stride, the leaf table will be accessed via the leaf table index to retrieve the forwarding decision. If the forwarding decision is not completely determined within the stride, a branch table is used to determine the location of the subsequent stride to be processed. The branch table is accessed via a branch table index generated by combining the branch table base pointer of the stride with a branch table index generated from one or more of the bitmaps included in the stride record.

The method and apparatus described herein provide techniques for compressing data associated with stride records. Techniques are also described for storing the data in an efficient manner such that forwarding decisions can be determined utilizing a minimal number of memory accesses. The compression techniques described herein enable the data associated with large strides to be stored in an efficient manner such that the memory required to store the forwarding or branching decisions for each stride is greatly reduced in comparison to prior art solutions. As such, rapid determination of forwarding decisions can be performed in a system that utilizes memory efficiently such that large strides can be accommodated with a practical amount of memory in a system that can support high speed routing.

Figure 3:
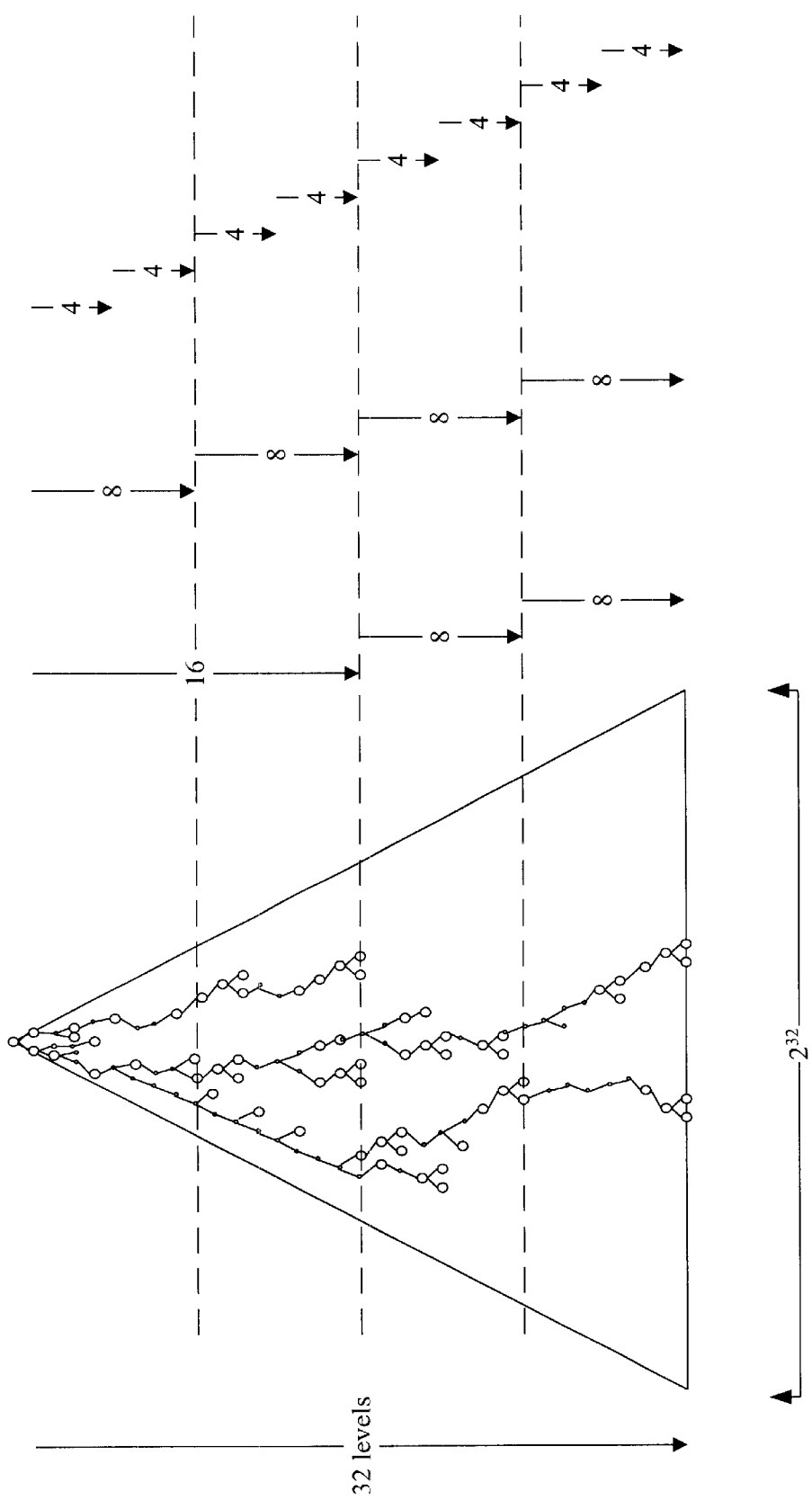
FIG. 3 illustrates a graphical representation of a prior art trie structure broken into a number of strides.
Figure 4:
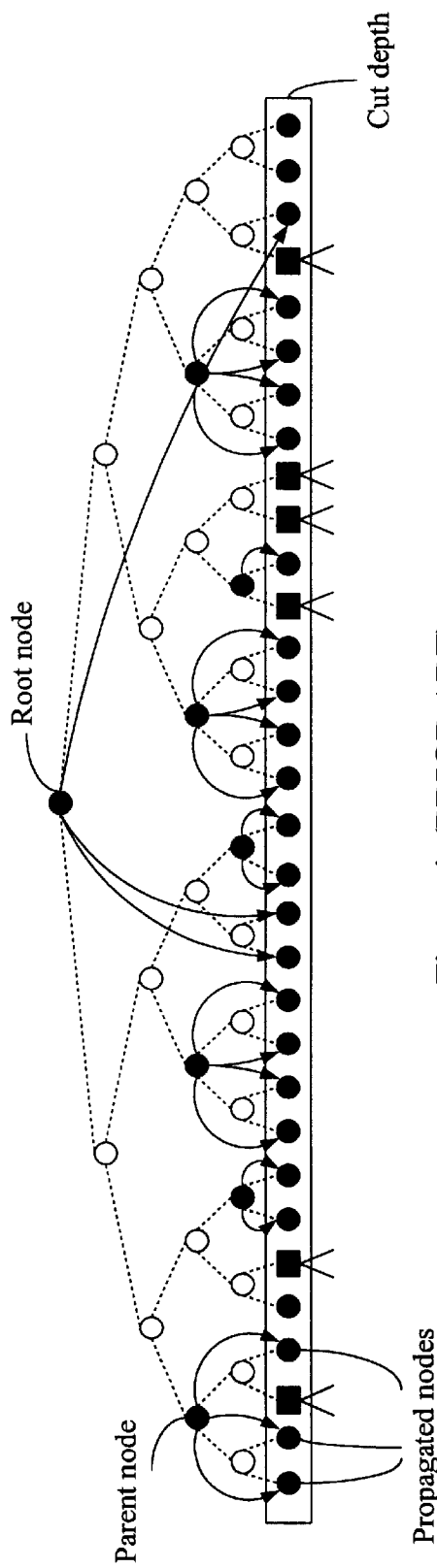
FIG. 4 illustrates a graphical representation of a prior art prefix-expanded trie.
Figure 5:
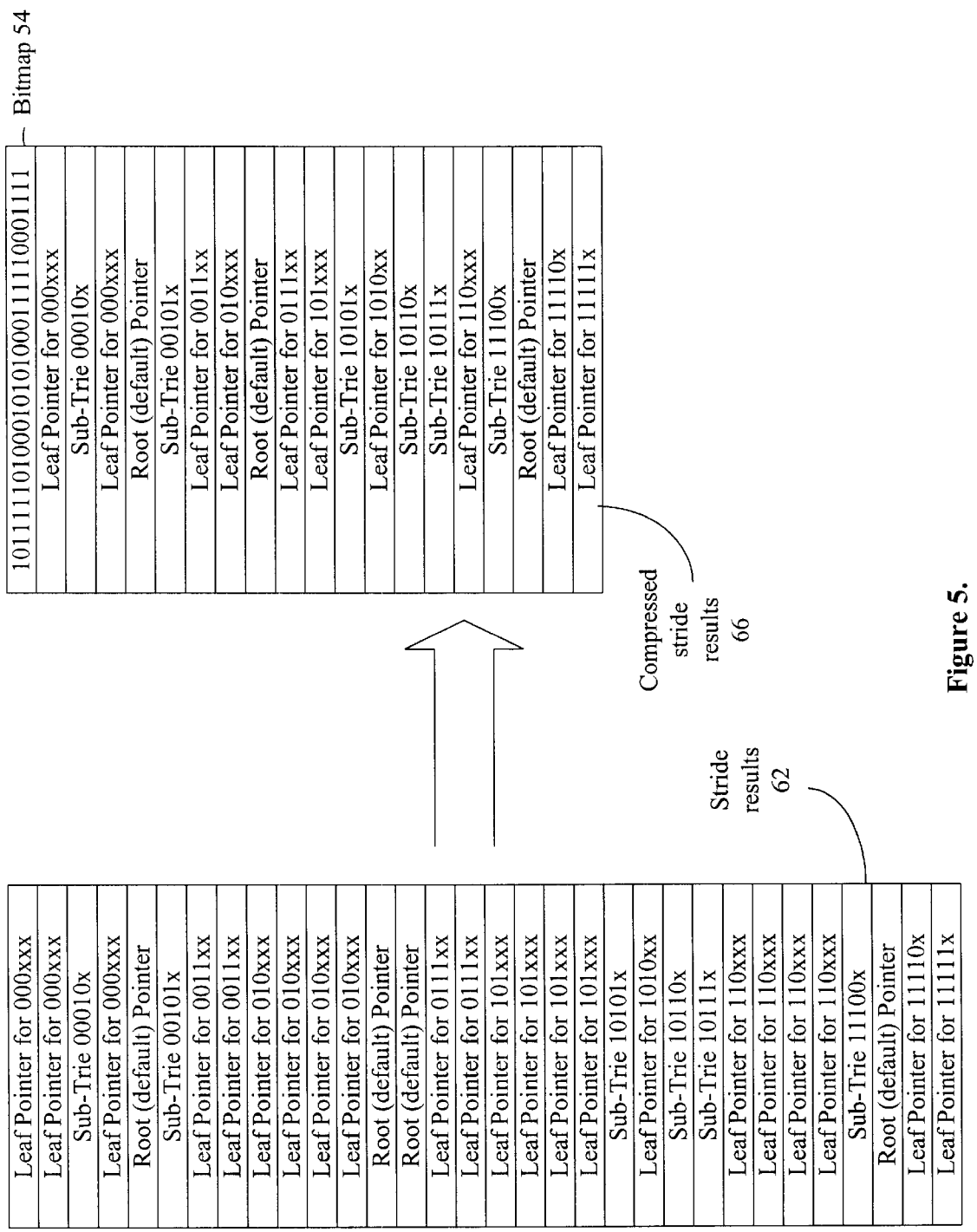
FIG. 5 illustrates compression of the stride results for a trie cut to a set of compressed stride results in accordance with a particular embodiment of the present invention.

The invention can be better understood with reference to FIGS. 5–18. FIG. 5 shows the list, or table of stride results 62 represents the corresponding pointers for each of the nodes in the extended trie structure of FIG. 4. At the top of the list, the leaf pointer for 000XXX corresponds to the left most shaded circle in the cut level of the trie structure of FIG. 4. The bottom-most entry in the list of stride results 62, a leaf pointer for 11111X, corresponds to the right most shaded circle at the cut level of the trie structure of FIG. 4.

As can be seen from the list of stride results 62 in FIG. 5, there is a fair amount of repetition for certain entries. For example, the first two entries of the table of stride results 62 are the same. This is because these entries correspond to a pair of the propagated nodes that were created and filled with the leaf pointer corresponding to the parent node. Similar sets of repeating pointers can be observed within the stride results 62.

Figure 6:
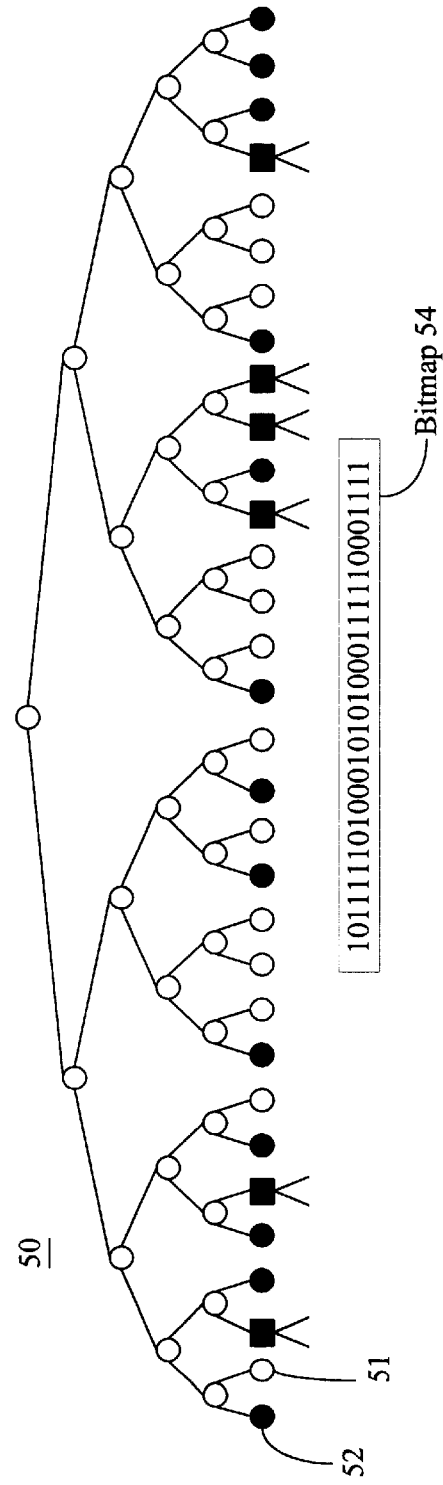
FIG. 6 illustrates a graphical representation of a trie cut associated with a stride that includes compressed nodes.

By recognizing that compression of the stride results 62 can be accomplished through a form of run length encoding, the amount of memory required to store the results for this 5-bit stride can be greatly reduced. FIG. 6 illustrates a compressed trie structure 50 in which consecutive repetitive results are compressed to a single result. A bitmap 54 is used to indicate whether or not a result is stored for a particular node. For example, the first bit in the bitmap 54 is a one, thus indicating that results are included in the compressed set of results for the first node 52 at the cut level.

As was seen in the table of stride results 62, the results for the second node 51 are the same as the result for the first node 52. As such, the bitmap stores a 0 at the bit location corresponding to the second node 51. A 0 bit entry in the bitmap 54 corresponds to a node for which the result has been compressed and, as such, the associated pointer is not immediately available. In order to retrieve this compressed pointer, a search algorithm must search for the first non-compressed entry (as represented by a 1 bit) to the left of the compressed entry in the bitmap 54. The pointer returned at this entry is identical to that which would have been stored for the compressed entry in an uncompressed format. The closest set bit corresponds to a node for which valid results are stored in the set of compressed stride results 66 illustrated in FIG. 5. This result is also applicable to the subsequent nodes for which a 0 is stored in the bitmap 54. As is illustrated, the compressed stride results 66 greatly reduce the number of pointers that must be stored to represent the results for each of the nodes at the cut level in the expanded trie structure. The bitmap 54 is used in conjunction with the set of compressed stride results 66 to determine the appropriate pointer for each of the nodes at the cut level.

Many modern processors include a single cycle instruction that scans a register for the least or most significant bit set. When combined with masking of portions of the bitmap 54, such operations provide an easy means for determining the next higher bit set in a particular bitmap with respect to a bit position selected by an address.

As stated above, in order to recover the appropriate pointer, or result, for a node within the cut section of a stride, the bitmap 54 can be used in conjunction with the compressed stride results 66. If the compressed stride results 66 are individually stored in a contiguous fashion within memory, an appropriate pointer can be determined by calculating an offset within the set of contiguous compressed results based on the number of set bits in the bitmap 54 to the left of the desired bit location. Although this may be accomplished by sequentially scanning the bitmap 54 and counting the number of 1's, more efficient means for calculating the number of 1's in a particular set of bits are commonly available. In many processors, a population count (popcount) operation may be available which calculates the number of 1's in a set of bits. Thus, by masking off the lower section of the bitmap 54 below the selected bit location and performing a popcount on the remaining set of bits, an offset to the table of compressed stride results 66 can be determined. In processors that do not support a specific popcount operation, a simple linear set of instructions can be used to calculate the popcount for a set of bits. One such set of instructions is detailed in the GNU C library.

Figure 7:
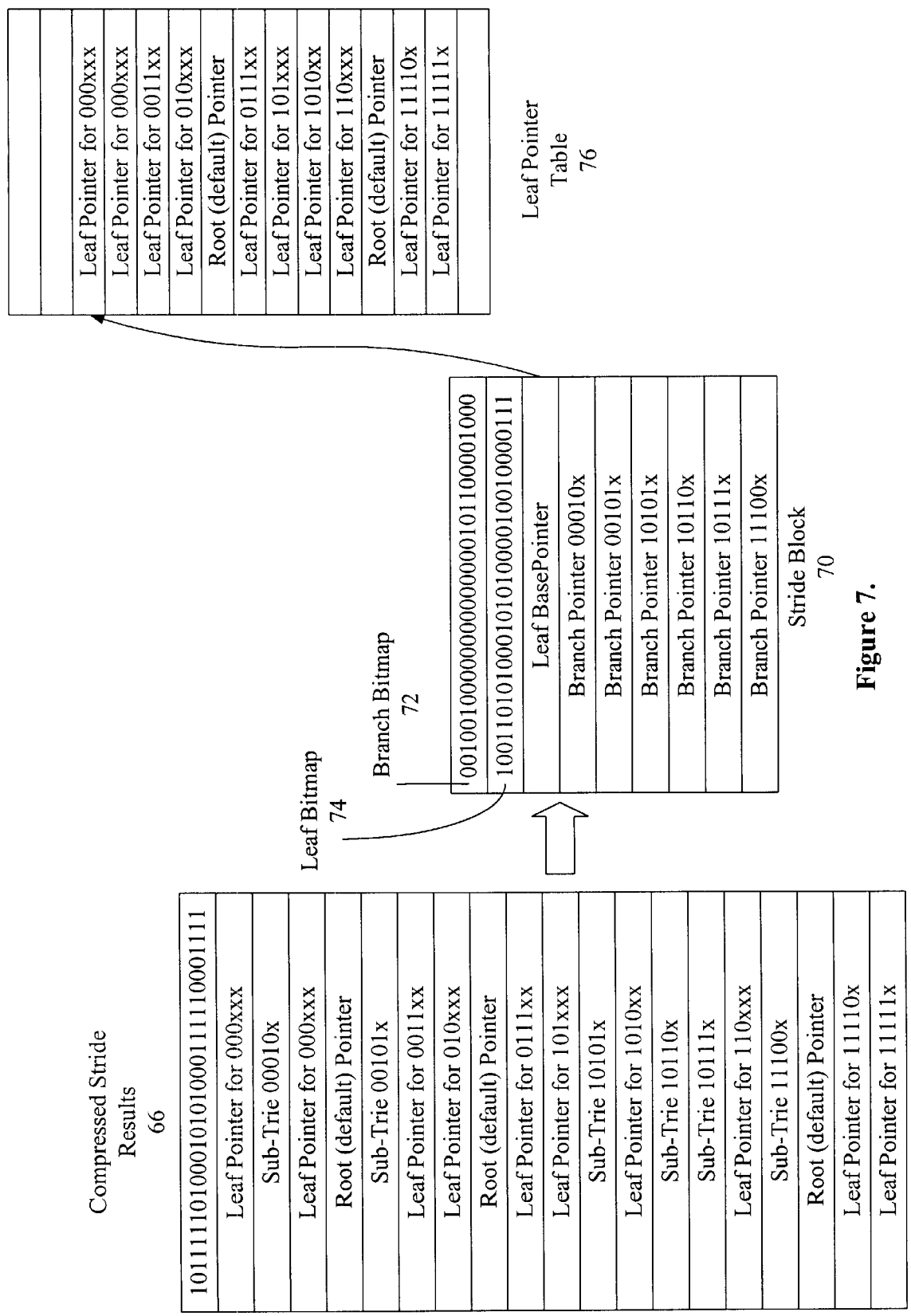
FIG. 7 illustrates the further compression of compressed stride results into a stride record and corresponding leaf and branch tables in accordance with a particular embodiment of the present invention.

Although the combination of the bitmap 54 and the set of compressed stride results 66 is illustrated in FIG. 6 reduces the amount of memory required to store the results for a particular trie cut, or stride, two memory accesses are still required in order to determine a specific result for a node. One memory access to retrieve the bitmap 54, and another to retrieve the appropriate pointer from the list of compressed stride results 66. FIG. 7 illustrates a refinement on the data structure of FIG. 6 in which an additional bitmap is added to the compressed record to indicate which of the pointers are leaf pointers. By storing the leaf pointers in a separate leaf pointer table and calculating an index to this table when a leaf is determined, the total number of memory accesses required can be reduced.

FIG. 7 illustrates the compressed stride results 66 being further compressed into a stride block 70 that includes a branch bitmap 72, a leaf bitmap 74, a leaf base pointer 75 and a set of branches 77 (sub-tries). "Block" is a term that may be used to describe a portion of the trie structure that includes the information for processing a stride. A set bit in the branch bitmap 72 indicates that the node corresponding to the bit location within the branch bitmap 72 has a result that corresponds to an entry in the list of branch pointers. A set bit within the leaf bitmap 74 indicates that the node to which the bit location within the leaf bitmap 74 corresponds has a result which is a leaf pointer stored in the leaf pointer table 76. If a leaf pointer needs to be referenced, a popcount can be used to determine an index within the leaf pointer table 76. This index can be combined with the leaf base pointer 75, which points to the first entry of the leaf pointer table 76, in order to access the appropriate entry within the leaf pointer table 76.

Figure 8:
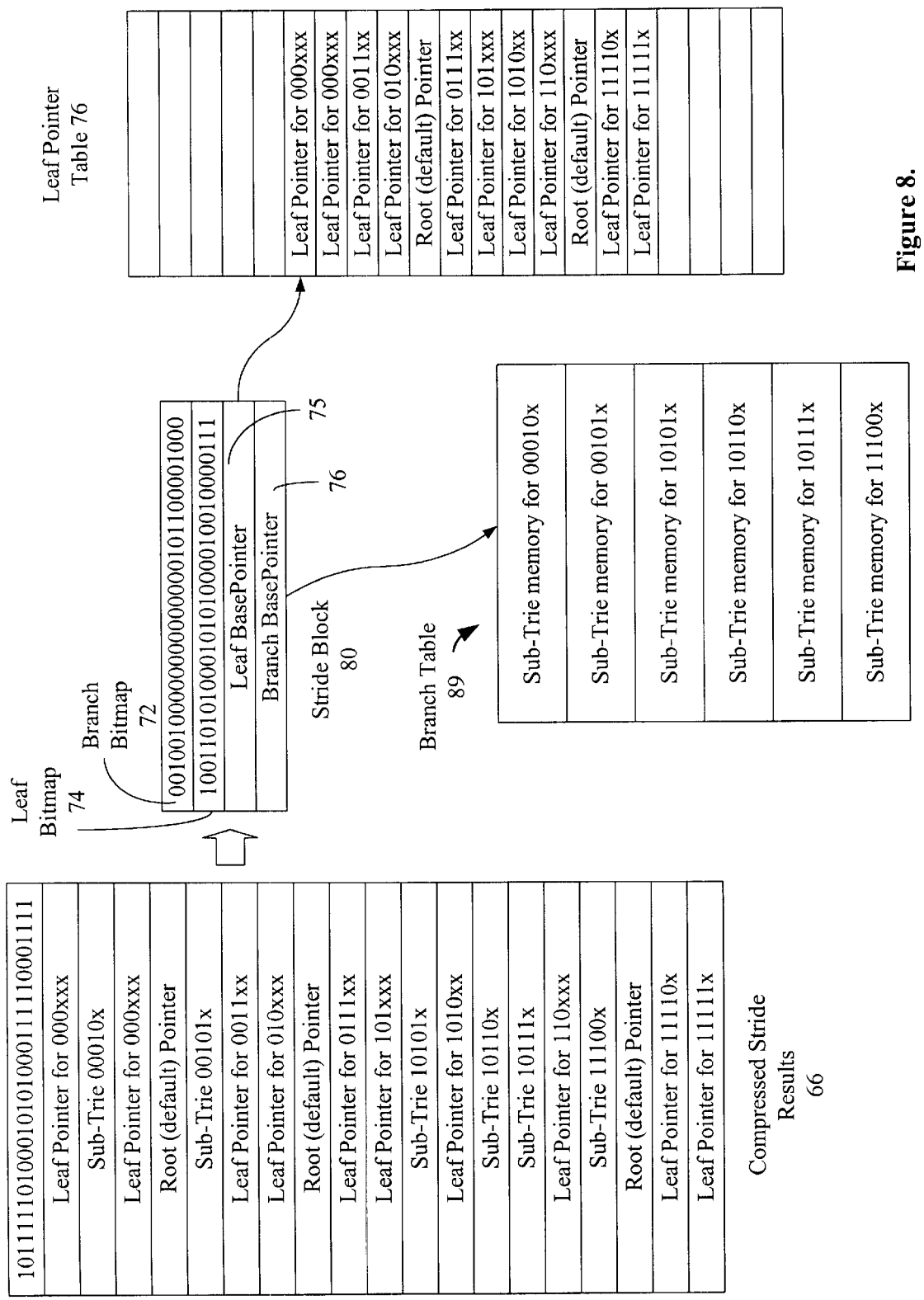
FIG. 8 illustrates an alternate form of further compression of the compressed stride results into a stride record that includes sub-tries and a corresponding leaf pointer table in accordance with a particular embodiment of the present invention.

In order to eliminate the list of sub-trie pointers from the stride block 70, the sub-tires are placed in contiguous memory, and the individual sub-trie pointers are replaced by a bitmap and a base pointer to the contiguous memory location. This is illustrated in FIG. 8. The stride record 80 of FIG. 8 has been reduced to the branch bitmap 72, the leaf bitmap 74, the leaf base pointer 75, and a branch base pointer 76. The branch base pointer 76 points to a base entry of a branch table 89 (which also may be referred to as a next sub-trie block) that stores the branches (sub-tries) for the particular stride. As was the case with the leaf pointer table 76, the branch table 89 can be accessed through a combination of the branch base pointer 76 and an offset generated using the branch bitmap 72. Thus, by masking off a portion of the branch bitmap 72 and performing a popcount on the remaining portion, the appropriate offset for the branch table 89 can be determined.

The stride block 80 in the compressed format shown in FIG. 8 is compact enough to fit within a cache line of a cache structure utilized by a processor for processing the stride. As is known in the art, an entire cache line (group of words) may be read from the cache in roughly the same time as is required to read a single word. This allows the stride to be processed in an efficient manner such that the forwarding decision for an address can be determined using a minimal number of memory accesses. Because of the compression performed, the amount of memory required to store the data required to process each stride is also greatly reduced in comparison with prior art solutions.

In order to further optimize the storage of the results for a particular stride, a differentiation can be made between subsequent blocks, which must be processed in order to determine the final forwarding decision. Some strides of the overall trie structure may include a small number of pointers that can be stored in a small amount of memory. These sparse sections of the trie can be compressed into a particular sparse compression format that is more efficient in terms of processing as it may include the actual results for leaves rather than pointers to a leaf table. In order to take advantage of the differentiation between sparse and dense blocks, the stride block that points to a subsequent sparse or dense block may include an encoding such that the type of compression used for the subsequent blocks is known. FIG. 9 illustrates a particular encoding technique that can be used to accomplish this differentiation. FIG. 9 illustrates a stride that includes compressed nodes. Each node at the cut level can have one of four states. These four states are encoded through the combination of an extends bitmap 95 and a type bitmap 96 included in the stride record 99. For each node at the cut level, there is a bit within the extended bitmap 95 and a bit within the type bitmap 96. The combination of these two bits for each node indicates the particular state of that node.

The extends and type bitmaps allow four states to be encoded for each node, which was not possible using the leaf and branch bitmaps as described thus far. As is apparent to one of ordinary skill in the art, the distinction between the use of the branch and leaf bitmaps as opposed to type and extends bitmaps is solely dependent on whether different encoding of blocks (sparse vs. dense) is employed in the system. For embodiments that only use one block encoding, branch and leaf bitmaps provide enough encoded states. For embodiments that support sparse and dense blocks, extends and type bitmaps provide the necessary number of states to indicate the type of encoding for subsequent blocks.

The first node is shown to have state that corresponds to a leaf indication 91. Nodes having a state corresponding to a leaf indication are shown as shaded circles. A leaf indication indicates that a valid entry is included within the leaf table for this particular node. A combination of the extends bitmap 95 and the type bitmap 96 will generate the leaf bitmap 74 described earlier, which can then be manipulated to determine an offset for the leaf table. This offset can then be combined with the leaf base pointer 75 to access the leaf table and fetch the forwarding decision for the node from the leaf table. Leaf indications are encoded with a 0 in the extends bitmap 95 and a 1 in the type bitmap 96. As is apparent to one of ordinary skill in the art, the particular bit encodings used in the examples described herein are arbitrary, and as long as the particular relationships between different bitmaps are preserved, differing bit values for various encodings may be utilized.

The second node location is shown to correspond to an empty indication 94, which is illustrated as an unshaded circle. Empty indications are encoded with a 0 in the extends bitmap 95 and a 0 in the type bitmap 96. An empty indication means that a search to the left must be performed to determine the appropriate result for this particular node as it has been compressed.

The third node location at the cut level is shown to correspond to a sparse indication 92. Sparse indications are indicated by a 1 in the extends bitmap 95 and a 0 in the type bitmap 96. A sparse indication means that the search extends beyond the cut level present in the trie structure 90. It further indicates that the subsequent stride block fetched based on the index generated for this node will be a sparse stride block, which, in one embodiment, may process a stride of 8 address bits. Knowing that the subsequent block to be fetched is a sparse block enables the processor to improve the efficiency with which the subsequent stride block is processed. This is because additional information can be stored within the sparse block, as it does not include as many end results as a dense block. An example sparse stride block 901 is illustrated in FIG. 10.

The sparse block 901 includes a branch base pointer that points to the next block in the trie structure. The leaf base pointer included in the sparse block stores a base address for the leaf table. All leaves for the sparse block are stored contiguously from this base address, and can be accessed by generating an appropriate offset using the type and extends bitmaps. The second line of the sparse block is shown to include eight values. Each of these values can be directly compared with the portion of the address that is being used to resolve this stride. If an exact match is found, then there is a pointer associated with that address in either the branch table or the leaf table. If no match it determined, a left search is performed such that the next highest value in the array of values is selected, which is analogous to the scan bit operation on a bitmap. Because only eight values are stored within the sparse block, the type and extends bitmaps are each only 8-bit bitmaps. The use of the type and extends bitmaps is identical to that of a dense block, and they can be used to determine offsets to either the branch table or the leaf table, and the bitmaps can also be used to distinguish between sparse and dense subsequent blocks.

Returning to FIG. 9, the sixth bit location within the cut level of the stride is shown to correspond to a dense indication 93. The dense indication 93 is indicated by a 1 in the extends bitmap 95 and a 1 in the type bitmap 96. A dense indication 93 indicates that an offset should be generated and combined with the branch base pointer 76 to reference a subsequent stride block that is a dense block. The stride block 99 of FIG. 9 is a dense stride block in that it includes a full extends bitmap and type bitmap for all of the nodes at the cut level for the stride. This is in contrast to a sparse block that only includes a limited set of values corresponding to a limited set of nodes, and the appropriate type and extends bitmaps for those particular values.

As stated earlier, a block is a portion of the trie structure that is used to process a stride. A block can be divided into a number of records where a particular record is selected by a portion of the address bits used to step through the stride. For example, a block for an 8-bit stride may be divided into eight records where three of the eight address bits used to process this stride are used to select a specific one of the records within the block corresponding to the stride. The remaining five bits could then be used to process the record selected, where the structure of the record may be similar to the structures described thus far for a 5-bit block. In other words, each record could be structured as a block in that it would include bitmaps and base pointers. FIG. 11 illustrates a dense record 911. The differentiation between blocks and strides will be further explained with reference to FIG. 18 below.

The dense record 911 includes an extends bitmap, a type bitmap, a number of bits that are reserved for future use (RFU), a branch table base pointer, a leaf table base pointer, and may include an indication as to how many of the blocks in the sub-trie below are sparse blocks. The indication as to how many blocks in the sub-trie below are sparse blocks can be used to optimize accesses to the sub-trie below.

Dense blocks are used where the density of pointers within a stride prohibits the use of the more memory efficient sparse blocks. One example of a dense block 921 for an 8-bit stride is shown in FIG. 12.

Note that the large bitmaps included in the dense block above may be difficult for software to manipulate, and the amount of data that has to be retrieved to process such a block is large. In addition, the fields within the block are not aligned to normal cache line boundaries, and the amount of contiguous memory that would likely be required for the leaf table and branch table would place restrictions on the dynamic allocation of memory in the implementation. However, the representation illustrated above does present the minimum memory usage for a dense block. In embodiments that include wide or separate memory structures, such a dense block structure may be practical.

In other embodiments where the dense blocks such as that illustrated above are less practical, dense blocks may be broken up into records to facilitate both the hardware implementation of the system and efficient processing by software. This was briefly discussed above. For example, a 32 bit microprocessor would most likely prefer to manipulate 32 bit bitmaps. Thus, for an 8-bit stride, eight stride records could be used which are indexed using the upper three bits of the stride. Each of the records would then be used to process the lower five bits of the stride, where the bitmaps in a 5-bit dense stride record would be 32-bit bitmaps.

In order to facilitate fetching of records for a subsequent stride, each record may include an indication of the number of sparse records included in the following stride block. If the sparse records are stored contiguously in the branch table before the dense records, indexing the branch table is simplified by keeping a count of the number of sparse records.

Figure 13:
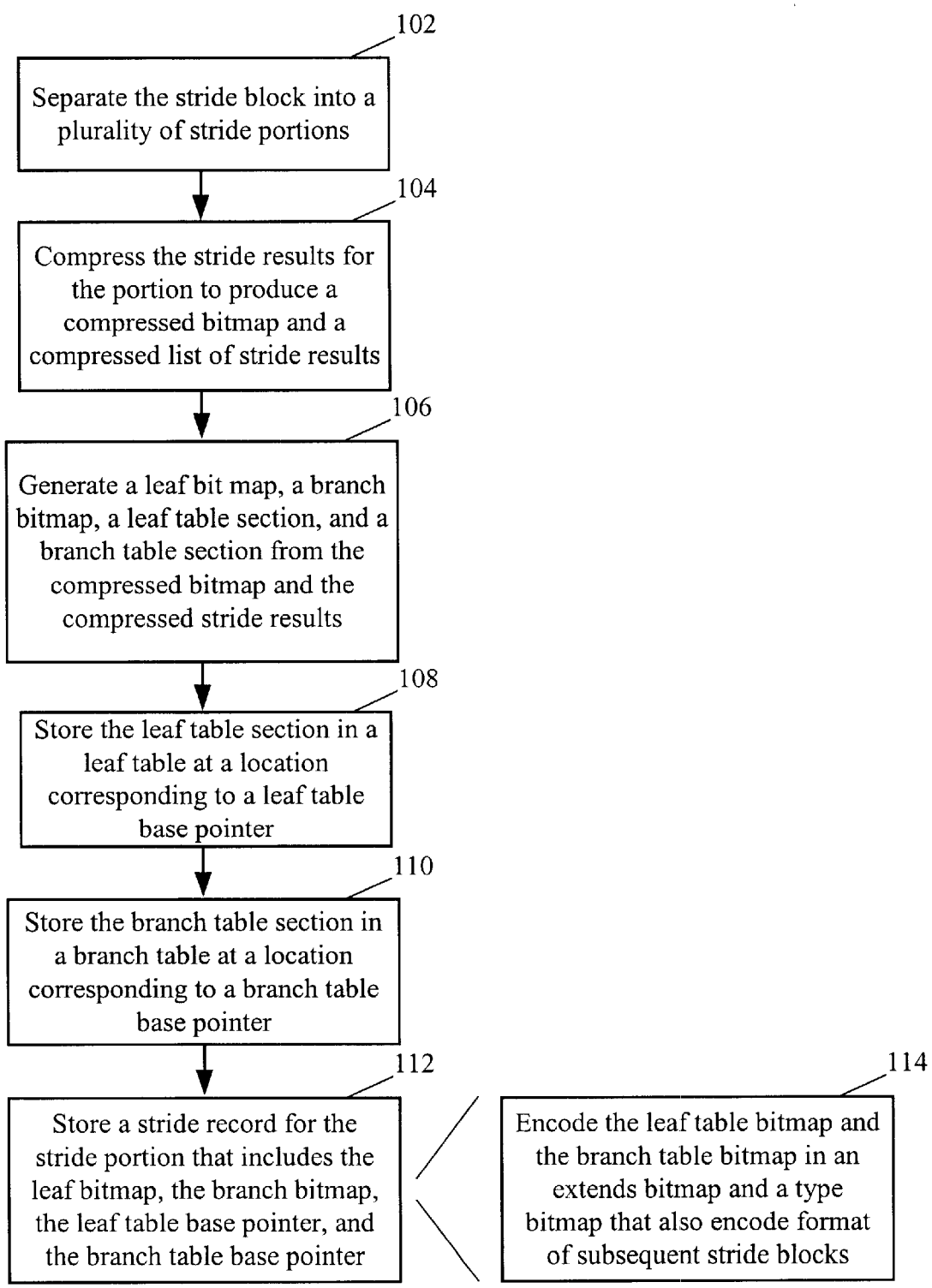
FIG. 13 illustrates a flow diagram of a method for compressing stride data in accordance with a particular embodiment of the present invention.

FIG. 13 illustrates a flow diagram of one method for compressing a dense stride block. At step 102 the stride block is separated into a plurality of stride portions. This is analogous to separating the block into a number of records. For each stride portion, or record, steps 104–112 are performed.

At step 104, the stride results for the portion are compressed to produce a compressed bitmap and a compressed list of stride results. This is the compression step illustrated in FIG. 6. At step 106, the compressed bitmap and compressed list of stride results are further compressed to produce a leaf bitmap, branch bitmap, leaf table section and a branch table section. This is similar to the step shown in FIG. 7 where the leaf table section corresponds to the set of leaf pointers included in the leaf pointer table for the stride portion, and the branch table section corresponds to the set of branch pointers for the stride portion. At step 108, the leaf table section is stored in the portion of memory or the table associated with the leaf pointers for the trie. Preferably, these leaf pointers are stored in a contiguous fashion within the leaf table starting at a leaf base pointer for the stride portion such that they can be accessed through the combination of a base pointer and offsets combined to produce indexes to the table.

At step 110, the branch table section is stored in memory starting at a location corresponding to a branch base pointer. Preferably, it is stored in a contiguous fashion in memory such that random access to the entries in the branch table can be performed using a base pointer and offsets.

At step 110, a stride record is stored in memory for the stride portion where the stride record includes the leaf bitmap, the branch bitmap, the leaf table base pointer at which the leaf table section was stored, and the branch table base pointer at which the branch table section for the stride portion was stored. Storing the stride record at step 112 may include encoding the leaf bitmap and the branch bitmap in an extends bitmap and a type bitmap as was described with respect to FIG. 9 above. The extends bitmap and type bitmap enable the stride record to encode sparse and dense format distinctions for subsequent stride blocks that are accessed via branch pointers included in the branch table.

Figure 14:
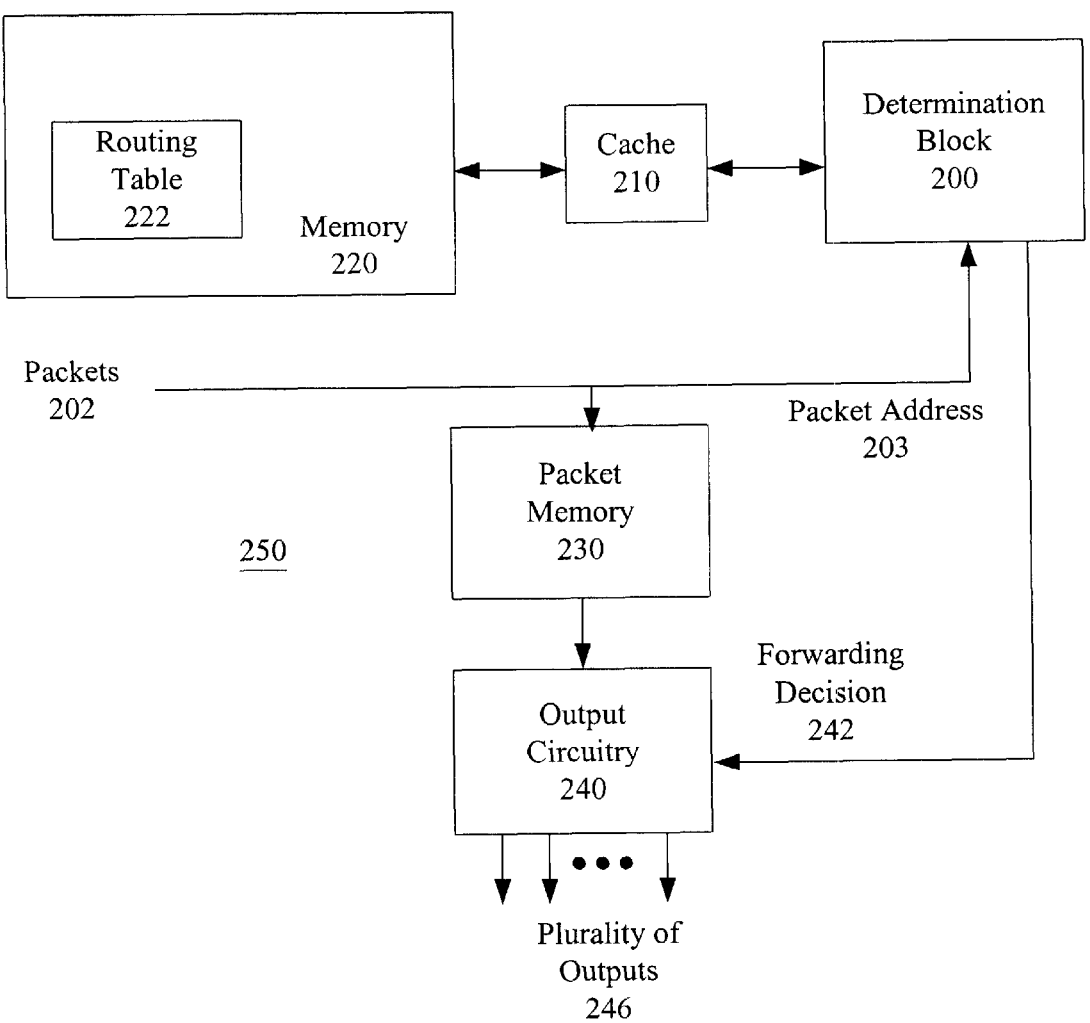
FIG. 14 illustrates a block diagram of a packet routing circuit in accordance with a particular embodiment of the present invention.

FIG. 14 illustrates a block diagram of a packet routing circuit 250 that may be used in conjunction with the trie compression techniques discussed thus far to perform packet routing in a communications network. The packet routing circuit 250 includes memory 220, a determination block 200, packet memory 230, and output circuitry 240. Packets 202 received by the packet routing circuit 250 are stored in the packet memory 230 while a forwarding decision for each packet is determined. The address 203 for each packet is provided to the determination block 200 that determines the routing decision 242 for each packet. The determination block 200 may be implemented as a state machine, discrete circuitry, or as a packet routing processor such as that illustrated in FIG. 15. The determination block 200 is operably coupled to a memory 220 that stores a forwarding table 222. Preferably, the forwarding table 222 is structured in a manner such that the forwarding decisions for packets are determined through the use of a compressed trie structure. The compressed trie structure may include a number of strides where the block corresponding to each stride may be broken into a number of records.

When the determination block 200 receives a packet address, it processes the address to determine a forwarding decision 242 in a manner similar to that illustrated in the flow diagram of FIG. 16, which is described in additional detail below. In order to facilitate the determination of the forwarding decision 242, a cache 210 may be included in the packet routing circuit 250. The cache 210, which is operably coupled to the memory 220 and the determination block 200, may be used to cache certain portions of the forwarding table 222 such that the determination of the forwarding decision 242 can be done in a more efficient manner that requires fewer accesses to the memory 220.

Once a forwarding decision 242 has been determined by the determination block 200, it is provided to the output circuitry 240. For each packet, the output circuitry receives a forwarding decision 242 and forwards the packet to at least one of the plurality of outputs 246 based on the forwarding decision.

Preferably, the packet routing circuit 250 is included in a router for use in a data communication network. Such a router may be used in a data communications network that supports IP traffic. The memory 220 may store a plurality of forwarding tables, where a particular forwarding table is selected for use in determining the forwarding decision for a particular packet based on either a field included in the packet or the identity of an input port over which the packet was received.

Figure 15:
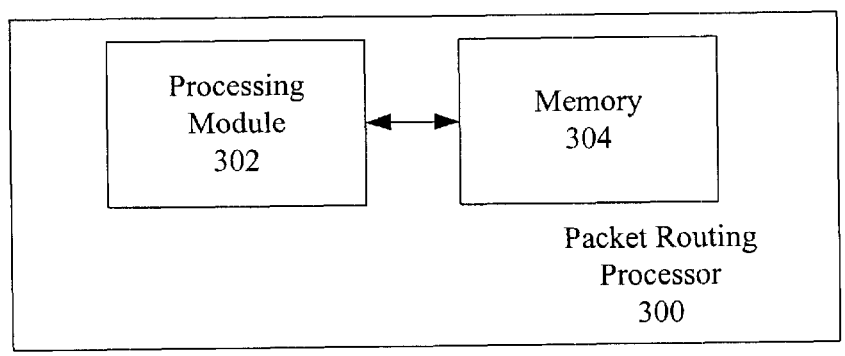
FIG. 15 illustrates a block diagram of a packet routing processor in accordance with a particular embodiment of the present invention.

FIG. 15 illustrates a packet routing processor 300 that includes a processing module 302 and memory 304. The packet routing processor preferably executes the method illustrated in FIG. 16 through the use of software stored as a set of operational instructions in the memory 304. The processing module 302 may include a single processing entity or a plurality of processing entities. Such a processing entity may be a microprocessor, a microcontroller, a digital signal processor or any device that processes information based on operational or programming instructions.

The memory 304 may be a single memory device or a plurality of memory devices. Such a memory device may be a read only memory device, random access memory device, floppy disk, hard drive memory, or any device that stores digital information. Note that the memory 304 may be incorporated in the memory 220 included in the packet routing circuit or may be a separate memory structure. The memory 304 stores programming or operational instructions that, when executed by the processing module 302, allow the processing module 302 to perform packet routing functions such as those illustrated in the flow diagram of FIG. 16. Note that the packet routing processor 300 may implement some of the functions of FIG. 16 through software stored in the memory 304, whereas other portions may be implemented using hardware or circuitry included within the packet routing processor 300. Thus, in some embodiments a mix of hardware and software may be used to perform the method illustrated in FIG. 16

Figure 16:
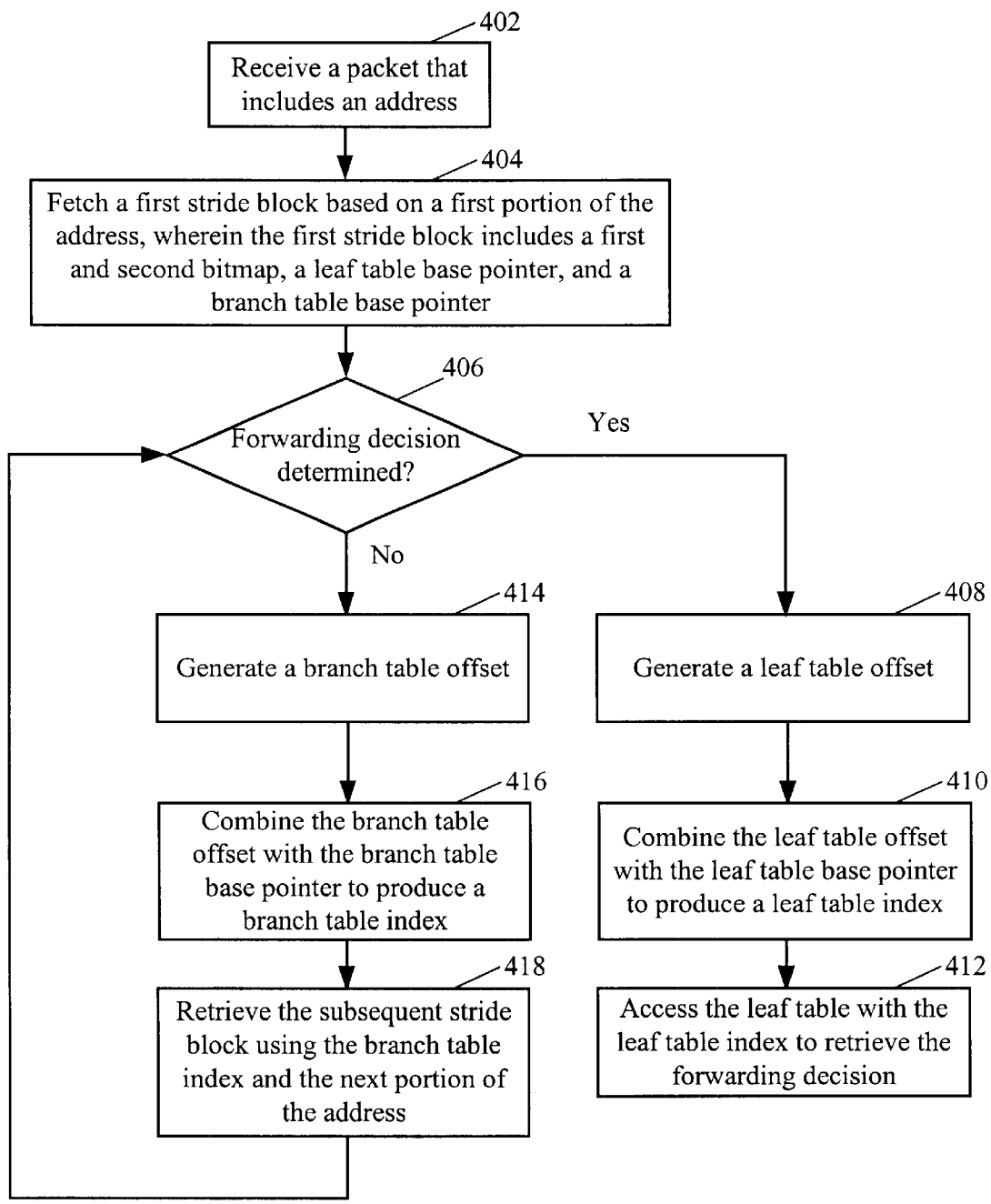
FIG. 16 illustrates a flow diagram of a method for packet routing in accordance with a particular embodiment of the present invention.

FIG. 16 illustrates a flow diagram of a method for packet routing in a communications network. The method begins at step 402 where a packet is received. The packet includes an address that is used to determine a forwarding decision for the packet. The forwarding decision is determined based on a compressed trie structure that may be stored in a forwarding table. The compressed trie structure is preferably made up of a number of strides where the blocks that make up a stride may be divided into a number of records where the blocks and records are preferably structured as indicated above.

At step 404 a first stride block is fetched using a first portion of the address. As stated above, a stride block may be broken into a number of records in order to simplify processing. In one embodiment, the most significant bits of the address are used to retrieve a stride record included in a stride block, where the most significant bits index between a number of stride records that make up a dense block within the trie structure. Each stride block includes a first bitmap, a second bitmap, a leaf table base pointer, and a branch table base pointer. Once the stride block has been fetched at step 404, it is processed using steps 406–416.

At step 406, it is determined if the forwarding decision for the address can be fully determined based on the stride block that has been fetched. This is determined based on at least one of the first and second bitmaps. The first bitmap is an extends bitmap and the second bitmap is a type bitmap, the extends bitmap alone can be used to determine if the forwarding decision is fully determined using this stride record.

If the forwarding decision is fully determined using the stride block, the method proceeds to 408 where a leaf table offset is generated from at least one of the first and second bitmaps and the second portion of the address. The second portion of the address is used to select a specific bit location within one or more of the bitmaps and a masking operation followed by a population count is used to determine an offset to the leaf table. The extends bitmap and type bitmap must be combined to generate the leaf bitmap. This can be accomplished by performing a bit-wise AND operation of the type bitmap and the bit-wise inverse of the extends bitmap.

At step 410, the leaf table offset generated at step 408 is combined with the leaf table base pointer to produce a leaf table index. This leaf table index is then used at step 412 to access the leaf table to retrieve the forwarding decision for the packet. The leaf table may either directly store the forwarding decisions, or may store pointers to a list of forwarding decisions.

If it determined at step 406 that the forwarding decision is not fully determined in this stride, the method proceeds to step 414 where the steps necessary to fetch a subsequent stride record or block commence. At step 414 a branch table offset is generated from the second portion of the address and at least one of the first and second bitmaps. If sparse and dense blocks are supported by the system in which the method of FIG. 16 is employed, generating the branch table offset may include generating either a branch table offset to a sparse block or to a dense block. The sparse and dense distinction and the encodings necessary for distinguishing between sparse and dense blocks were described with respect to FIG. 9 above. Thus, extend and type bitmaps are required for distinguishing sparse and dense blocks. The generation of the branch table offset is performed using masking and popcount steps in a similar manner as those used to generate the leaf table offset.

At step 416, the branch table offset is combined with a branch table base pointer to produce a branch table index. The branch table index is then used to retrieve a subsequent stride block at step 418. Step 418 may include retrieving a subsequent block corresponding to a stride and then indexing to a particular record within the stride. It may also involve simply fetching a subsequent sparse block in its entirety.

Figure 17:
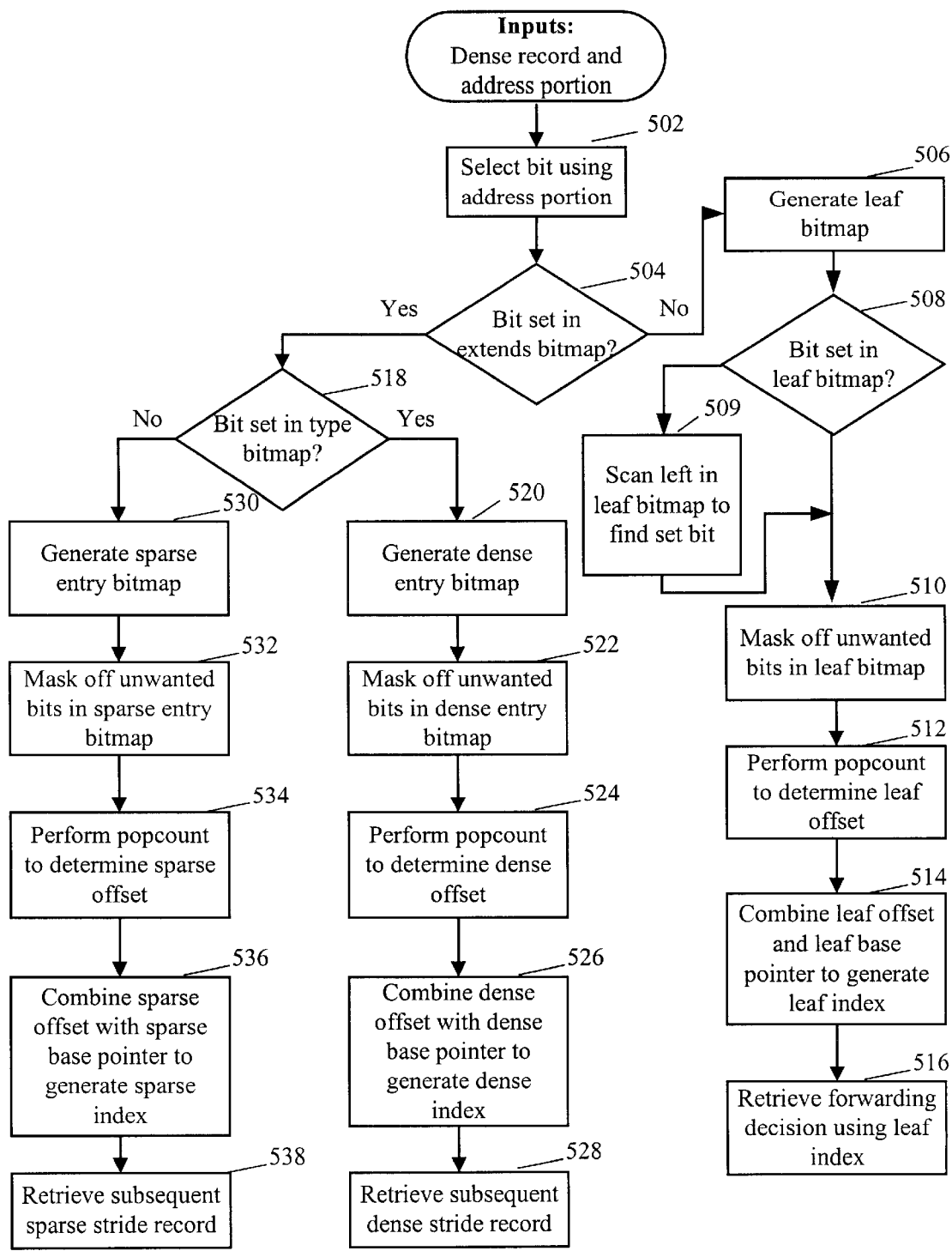
FIG. 17 illustrates a flow diagram of a method for processing a dense stride record in accordance with a particular embodiment of the present invention.

A method that may be used for processing the dense blocks are illustrated in FIG. 17, which has been included for added clarity. FIG. 17 illustrates a flow diagram of a method for processing a dense block or record utilizing a portion of the address corresponding to the packet. At step 502 a particular bit within the bitmaps included for the dense record is selected using the address portion. At step 504 it is determined if the bit to which the address portion corresponds is set within the extends bitmap. If not, this indicates that a leaf will be reached during this record, and steps 506–516 are executed in order to retrieve a forwarding decision for that leaf.

At step 506 the leaf bitmap is generated by bit-wise ANDing the type bitmap with the bit-wise inverse of the extends bitmap. At step 508, it is determined if the bit to which the address portion corresponds in the leaf bitmap is set. If it is, the method proceeds to step 510, and if it is not, the method proceeds to step 509. At step 509, a scan to the left in the leaf bitmap is performed to find the next set bit. At step 510, unwanted bits in the leaf bitmap generated at step 506 are masked off. The unwanted bits are those bits to the right of the set bit determined at step 506.

At step 512, a popcount is performed on the remaining non-masked bits in the leaf bitmap in order to determine a leaf offset. At step 514, the leaf offset is combined with the leaf base pointer for the record to generate a leaf index. This leaf index is then used at step 516 to retrieve the forwarding decision for the packet.

If it is determined at step 504 that the bit in the extends bitmap corresponding to the portion of the address is set, this indicates that a subsequent block must be fetched in order to further process the address. As such, the method proceeds to step 518. At step 518 it is determined if the bit corresponding to the address portion is also set in the type bitmap, where the type bitmap indicates whether or not the subsequent block to be fetched is sparse or dense. If the bit is set at 518, a dense block is to be processed, and the method proceeds to step 520.

At step 520, the dense entry bitmap is generated by bit-wise ANDing the type and extends bitmaps together. Unwanted bits in the dense entry bitmap are masked off at step 522, where those bits to the right of that selected by the address portion are masked. At step 524, a popcount is performed on the remaining non-masked bits in order to determine a dense offset.

At step 526, the dense offset is combined with a dense base pointer to generate the dense index. Assuming that all sparse blocks are contiguously stored based on a branch base pointer, and all dense blocks are stored immediately following the sparse blocks (also contiguously), the dense base pointer may be determined by adding the size of the number of sparse blocks included in the subsequent block to the branch base pointer. Thus, storing the number of sparse blocks included in a subsequent stride as described earlier can be used to efficiently generate pointers to subsequent dense stride blocks. The dense index generated at step 526 can then be used at step 528 to retrieve the subsequent dense stride block. Because the processing system already knows that the subsequent block is a dense block, it will be fetched and processed in the manner most efficient for dense blocks.

If at step 518 it is determined that the bit corresponding to the address portion is not set in the type bitmap, the subsequent record to be fetched is a sparse block. As such, a sparse entry bitmap is generated at step 530. This is accomplished by bit-wise ANDing the extends bitmap with the bit-wise inverse of the type bitmap.

At step 532, unwanted bits in the sparse entry bitmap are masked off. At step 534, a popcount is performed to determine a sparse offset. The sparse offset is combined with a sparse base pointer at step 536 to generate a sparse index. Note that if the sparse records for the subsequent stride are all stored contiguously prior to the dense records, the sparse base pointer will simply be the branch base pointer for the subsequent stride. At step 538, the subsequent sparse stride record is retrieved using the sparse index generated at step 536.

The methodology for processing a sparse stride record or block is similar to that for processing a dense record. The exception is that rather than checking the extends and type bitmaps at a particular bit location corresponding to the portion of the address, a comparison must first be performed with the values included in the sparse record. If a match is determined, the bit location corresponding to that value in the extends and type bitmaps is consulted to determine if a leaf has been reached or if a subsequent sparse or dense record must be fetched. If no match is determined, the next higher value is selected, and the bit location corresponding to that value is referenced in the bitmaps. As stated earlier, this is analogous to performing a scan left operation in a dense bit map.

Figure 18:
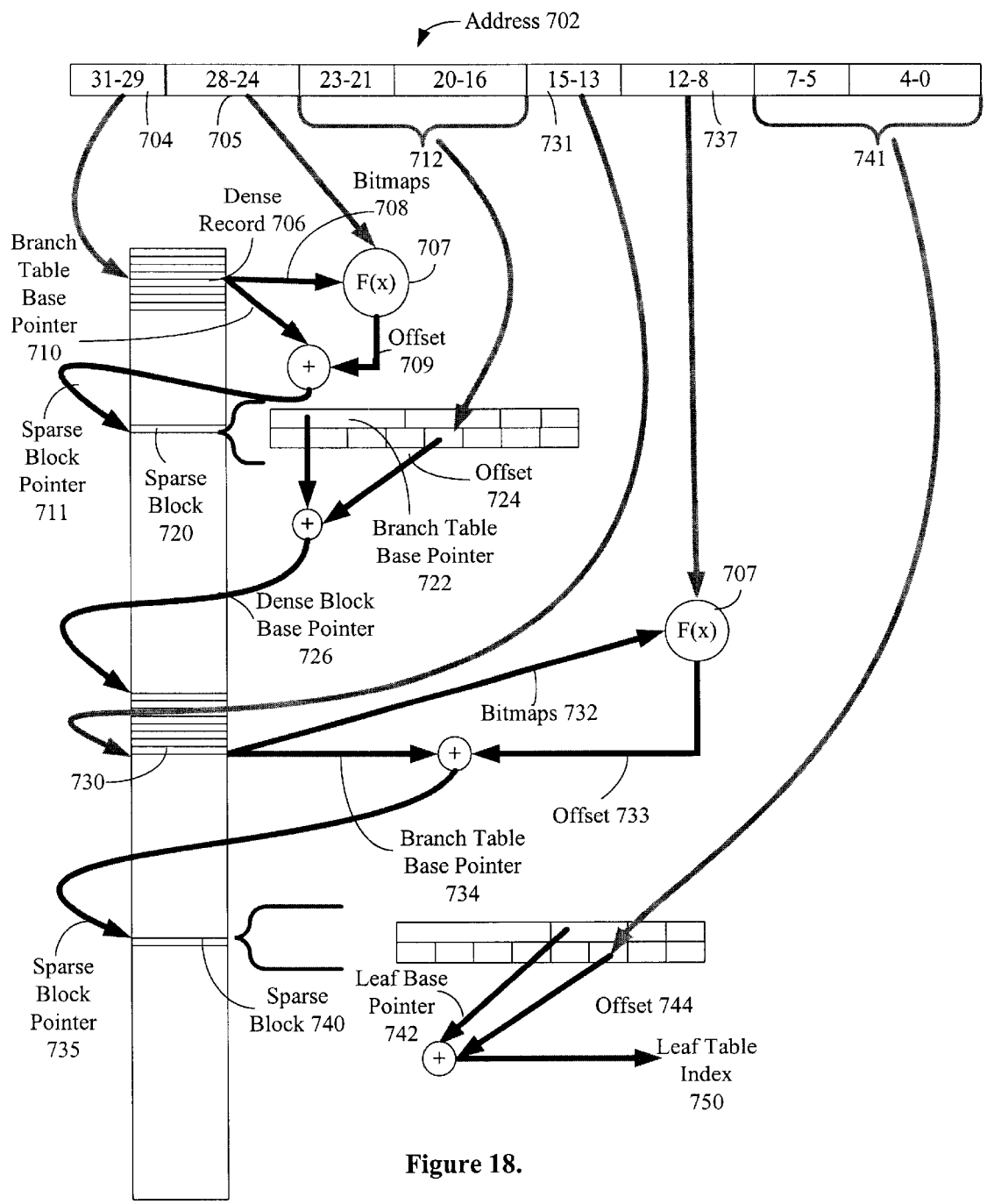
FIG. 18 illustrates a graphical representation of the determination of a forwarding decision for a particular address in accordance with a particular embodiment of the present invention.

FIG. 18 illustrates a graphical representation of the determination of a leaf table pointer 750 utilizing an address 702 that is provided as an example to supplement the discussion above. A first portion of the address 704 is applied to a block corresponding to the first stride in the trie structure that stores the potential prefix matches for the address. The first portion of the address 704 indexes through this dense block to select the dense record 706. Although the first stride is shown to process 8 bits of the address 702, in other embodiments, the first stride may process 16 bits of the address. Processing the first 16 bits of the address in a single stride may allow the average number of memory accesses required to process an address to be reduced at the cost of additional memory. Thus, the number of bits processed in each stride of a system may be selected based on both speed and memory considerations.

In one embodiment, it is assumed that the first block of the trie structure is always encoded as a dense block. As is apparent to one of ordinary skill in the art, this block may also be encoded as a sparse block in some circumstances, but in embodiments that support sparse or dense encoding of the first block, an external variable that indicates the type of encoding used must be available such that processing of the first block is properly performed.

The bitmaps 708 for the dense record 706 are processed via a function 707, which processes the bitmaps using a second portion of the address 705 to generate an offset 709. Note that this assumes that the address 702 will require multiple records to determine the forwarding decision. If the forwarding decision were determined based on the dense record 706 alone, a leaf in the trie would have been reached during the first stride, and no further processing would be necessary.

The offset 709 is combined with the branch table base pointer 710 for the dense record 706 to generate a sparse block pointer 711. The offset 709 was preferably determined in a manner that included a differentiation between subsequent blocks being sparse or dense. Thus, the processor will know that the next block to be fetched is sparse, and can be fetched and processed accordingly.

The sparse block pointer 711 is used to retrieve the sparse block 720. Because the sparse block 720 is sparse, the subsequent eight bits of the address that make up address portion 712 are used in comparison operations with each of the values included in the array of values of the sparse block 720. This value comparison generates an offset 724 that is combined with a branch table base pointer 722 for the sparse block to generate a subsequent dense block base pointer 726.

The dense block base pointer 726 points to the beginning of a dense block which is indexed through by a subsequent portion of the address 731. This indexing selects a particular dense record 730 within the dense block. The bitmaps 732 for the dense record 730 are provided to the function 707 along with address bits 737 to produce the offset 733. The offset 733 is then combined with a branch table base pointer 734 for the dense record 730 to produce a sparse block pointer 735 that selects the sparse block 740.

The final eight bits of the address 741 are then used to compare with the values stored in the sparse block to produce the offset 744. The offset 744 is combined with the leaf table base pointer 742 of the sparse block 740 to generate the leaf table index 750. The leaf table index 750 can then be used to access the leaf table and retrieve the forwarding decision for the packet. It should be noted that dense and sparse blocks can be combined in any order when processing an address. FIG. 18 illustrates one example of one such combination.

The present invention provides a means for compressing the data associated with strides in trie structures in a manner that improves memory usage and reduces the average number of memory access required to determine a forwarding decision for a packet. As such, higher speed networks can be supported without the need for impractically large memory structures to store the trie structures. Utilization of the compressed data structures requires only linear operations, thus reducing the overall cost and complexity of the packet forwarding system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for packet routing, comprising:

receiving a packet that includes an address;

fetching a first stride block based on a first portion of the address, wherein each stride block includes a first bitmap, a second bitmap, a leaf table base pointer, and a branch table base pointer;

processing the first stride block, wherein processing a stride block includes:

determining if a forwarding decision is determined based on a second portion of the address and at least one of the first and second bitmaps of the stride block;

when the forwarding decision is determined based on at least one of the first and second bitmaps:

generating a leaf table offset from at least one of the first and second bitmaps and the second portion of the address;

combining the leaf table offset with the leaf table base pointer to produce a leaf table index; and accessing a leaf table using the leaf table index to retrieve the forwarding decision;

when the forwarding decision is not determined based on the second portion of the address and at least one of the first and second bitmaps;

generating a branch table offset from the second portion of the address and at least one of the first and second bitmaps;

combining the branch table offset with the branch table base pointer to produce a branch table index;

accessing a branch table using the branch table index to retrieve a subsequent stride block; and processing the subsequent stride block and any additional subsequent stride blocks generated using additional portions of the address until the forwarding decision is retrieved.

2. The method of claim 1, wherein the first bitmap is a leaf bitmap and the second bitmap is a branch bitmap, wherein determining if a forwarding decision is determined further comprises determining if the forwarding decision is determined based on the second portion of the address and the leaf and branch bitmaps, wherein generating the leaf table offset further comprises generating the leaf table offset from the second portion of the address and the leaf bitmap, and wherein generating the branch table offset further comprises generating the branch table offset from the second portion of the address and the branch bitmap.

3. The method of claim 2, wherein generating the leaf table offset further comprises:

masking off a portion of the leaf bitmap to produce a masked leaf bitmap, wherein the portion of the leaf bitmap that is masked off is determined based on the second portion of the address; and performing a population count on the masked leaf bitmap to produce the leaf offset.

4. The method of claim 2, wherein generating the branch table offset further comprises:

masking off a portion of the branch bitmap to produce a masked branch bitmap, wherein the portion of the branch bitmap that is masked off is determined based on the second portion of the address; and performing a population count on the masked branch bitmap to produce the branch offset.

5. The method of claim 1, wherein accessing the leaf table using the leaf table index to retrieve the forwarding decision further comprises:

accessing the leaf table to retrieve a pointer to the forwarding decision; and retrieving the forwarding decision using the pointer to the forwarding decision.

6. The method of claim 1, wherein the first bitmap is an extends bitmap and the second bitmap is a type bitmap, wherein determining if a forwarding decision is determined further comprises determining if the forwarding decision is determined based on the second portion of the address and the extends bitmap, wherein generating the leaf table offset further comprises generating the leaf table offset from the second portion of the address and the extends and type bitmaps, and wherein generating the branch table offset further comprises generating the branch table offset from the second portion of the address and the extends and type bitmaps.

7. The method of claim 6, wherein generating the leaf table offset further comprises:

combining the extends bitmap and the type bitmap to generate a leaf bitmap;

masking off a portion of the leaf bitmap to produce a masked leaf bitmap, wherein the portion of the leaf bitmap that is masked off is determined based on the second portion of the address; and performing a population count on the masked leaf bitmap to produce the leaf offset.

8. The method of claim 6, wherein generating the branch table offset further comprises:

combining the extends bitmap and the type bitmap to generate a branch bitmap;

masking off a portion of the branch bitmap to produce a masked branch bitmap, wherein the portion of the branch bitmap that is masked off is determined based on the second portion of the address; and performing a population count on the masked branch bitmap to produce the branch offset.

9. The method of claim 8, wherein the type bitmap identifies each subsequent stride block as one of a sparse stride block and a dense stride block.

10. The method of claim 9, wherein subsequent stride blocks for each stride block are stored in contiguous sets.

11. The method of claim 10, wherein sparse blocks are grouped together and dense blocks are grouped together in the contiguous sets.

12. A packet routing processor, comprising:

a processing module; and memory operably coupled to the processing module, wherein the memory stores operating instructions such that, when executed by the processing module, the operating instructions cause the processing module to perform the functions of:

fetching a first stride block based on a first portion of an address for a received packet, wherein each stride block includes a first bitmap, a second bitmap, a leaf table base pointer, and a branch table base pointer;

processing the first stride block, wherein processing a stride block includes:

determining if a forwarding decision is determined based on a second portion of the address and at least one of the first and second bitmaps of the stride block;

when the forwarding decision is determined based on at least one of the first and second bitmaps:

generating a leaf table offset from at least one of the first and second bitmaps and the second portion of the address;

combining the leaf table offset with the leaf table base pointer to produce a leaf table index; and accessing a leaf table using the leaf table index to retrieve the forwarding decision;

when the forwarding decision is not determined based on the second portion of the address and at least one of the first and second bitmaps;

generating a branch table offset from the second portion of the address and at least one of the first and second bitmaps;

combining the branch table offset with the branch table base pointer to produce a branch table index;

accessing a branch table using the branch table index to retrieve a subsequent stride block; and processing the subsequent stride block and any additional subsequent stride blocks generated using additional portions of the address until the forwarding decision is retrieved.

13. The packet routing processor of claim 12, wherein the first bitmap is a leaf bitmap and the second bitmap is a branch bitmap, wherein determining if a forwarding decision is determined further comprises determining if the forwarding decision is determined based on the second portion of the address and the leaf and branch bitmaps, wherein generating the leaf table offset further comprises generating the leaf table offset from the second portion of the address and the leaf bitmap, and wherein generating the branch table offset further comprises generating the branch table offset from the second portion of the address and the branch bitmap.

14. The packet routing processor of claim 13, wherein generating the leaf table offset further comprises:
    masking off a portion of the leaf bitmap to produce a masked leaf bitmap, wherein the portion of the leaf bitmap that is masked off is determined based on the second portion of the address; and
    performing a population count on the masked leaf bitmap to produce the leaf offset.

15. The packet routing processor of claim 13, wherein generating the branch table offset further comprises:
    masking off a portion of the branch bitmap to produce a masked branch bitmap, wherein the portion of the branch bitmap that is masked off is determined based on the second portion of the address; and
    performing a population count on the masked branch bitmap to produce the branch offset.

16. The packet routing processor of claim 12, wherein accessing the leaf table using the leaf table index to retrieve the forwarding decision further comprises:
    accessing the leaf table to retrieve a pointer to the forwarding decision; and
    retrieving the forwarding decision using the pointer to the forwarding decision.

17. The packet routing processor of claim 12, wherein the first bitmap is an extends bitmap and the second bitmap is a type bitmap, wherein determining if a forwarding decision is determined further comprises determining if the forwarding decision is determined based on the second portion of the address and the extends bitmap, wherein generating the leaf table offset further comprises generating the leaf table offset from the second portion of the address and the extends and type bitmaps, and wherein generating the branch table offset further comprises generating the branch table offset from the second portion of the address and the extends and type bitmaps.

18. The packet routing processor of claim 17, wherein generating the leaf table offset further comprises:
    combining the extends bitmap and the type bitmap to generate a leaf bitmap;
    masking off a portion of the leaf bitmap to produce a masked leaf bitmap, wherein the portion of the leaf bitmap that is masked off is determined based on the second portion of the address; and
    performing a population count on the masked leaf bitmap to produce the leaf offset.

19. The packet routing processor of claim 17, wherein generating the branch table offset further comprises:
    combining the extends bitmap and the type bitmap to generate a branch bitmap;
    masking off a portion of the branch bitmap to produce a masked branch bitmap, wherein the portion of the branch bitmap that is masked off is determined based on the second portion of the address; and
    performing a population count on the masked branch bitmap to produce the branch offset.

20. The packet routing processor of claim 19, wherein the type bitmap identifies each subsequent stride block as one of a sparse stride block and a dense stride block.

21. The packet routing processor of claim 20, wherein dense stride blocks store subsequent sparse stride blocks and subsequent dense stride blocks in contiguous sets.

22. A packet routing circuit, comprising:
    a packet memory receives packets and stores the packets prior to forwarding, wherein each packet includes an address;
    output circuitry operably coupled to the packet memory, wherein for each packet, the output circuitry receives a forwarding decision and forwards the packet to at least one of a plurality of outputs based on the forwarding decision;
    memory that stores a forwarding table, wherein the forwarding table stores forwarding decisions for the packets; and
    a determination block operably coupled to the memory and the output circuitry, wherein the determination block receives the address for each packet and determines the forwarding decision for the packet, wherein the determination block provides the forwarding decision for the packet to the output circuitry such that the packet is forwarded to at least one of the outputs, wherein determining the forwarding decision for the packet includes:
        fetching a first stride block from the forwarding table stored in the memory based on a first portion of an address for a received packet, wherein each stride block includes a first bitmap, a second bitmap, a leaf table base pointer, and a branch table base pointer;
        processing the first stride block, wherein processing a stride block includes:
            determining if a forwarding decision is determined based on a second portion of the address and at least one of the first and second bitmaps of the stride block;
            when the forwarding decision is determined based on at least one of the first and second bitmaps:
                generating a leaf table offset from at least one of the first and second bitmaps and the second portion of the address;
                combining the leaf table offset with the leaf table base pointer to produce a leaf table index; and
                accessing a leaf table stored in the memory using the leaf table index to retrieve the forwarding decision;
            when the forwarding decision is not determined based on the second portion of the address and at least one of the first and second bitmaps;
                generating a branch table offset from the second portion of the address and at least one of the first and second bitmaps;
                combining the branch table offset with the branch table base pointer to produce a branch table index;
                accessing a branch table stored in the memory using the branch table index to retrieve a subsequent stride block; and
        processing the subsequent stride block and any additional subsequent stride blocks generated using additional portions of the address until the forwarding decision is retrieved.

23. The packet routing circuit of claim 22 further comprises a cache operably coupled to the memory and the determination block, wherein the cache stores at least a portion of the forwarding table.

24. The packet routing circuit of claim 22, wherein the memory stores a plurality of forwarding tables, wherein a particular forwarding table is selected for use in determining the forwarding decision for a particular packet based on at least one of a field included in the particular packet and an identity of an input port to the packet routing circuit over which the particular packet was received.

25. The packet routing circuit of claim 22, wherein the determination block further comprises:
    a processing module; and an instruction memory operably coupled to the processing module, wherein the instruction memory stores instructions that, when executed by the processing module, cause the processing module to perform functions necessary to determine the forwarding decision for the packet.

26. The packet routing circuit of claim 22, wherein the determination block further comprises a state machine.

27. The packet routing circuitry of claim 22, wherein the packet routing circuitry is included in a router.

28. The packet routing circuit of claim 27, wherein the packets are internet protocol (IP) packets.

29. The packet routing circuit of claim 22, wherein the determination block utilizes population counts to determine branch and leaf offsets.

30. The packet routing circuit of claim 22, wherein the determination block utilizes linear operations to determine the forwarding decision for each of the packets.

31. A method for compressing a stride included in a trie structure, wherein the stride includes a plurality of nodes, comprising:
   separating the stride into a plurality of stride portions, wherein each stride portion includes stride results for a portion of the plurality of nodes, wherein a stride result is one of a leaf pointer and a branch pointer; and
   for each stride portion:
      compressing the stride results for the stride portion using run length encoding to produce a compression bitmap and a compressed list of stride results;
      generating a leaf bitmap, a branch bitmap, a leaf table section, and a branch table section from the compression bitmap and the compressed list of stride results;
      storing the leaf table section in a leaf table at a leaf table base pointer for the stride portion;
      storing the branch table section in a branch table at a branch table base pointer for the stride portion; and
      storing a stride block in memory for the stride portion, wherein the stride block includes the leaf bitmap, the branch bitmap, the leaf table base pointer, and the branch table base pointer.

32. The method of claim 31, wherein compressing the results for a stride block further comprises selecting one of a sparse compression format and a dense compression format based on a number of compressed stride results; and wherein
   storing the stride block in memory further comprises storing the stride block in the selected one of the sparse compression format and the dense compression format.

33. The method of claim 32, wherein the leaf bitmap and branch bitmap for each stride block are encoded in an extends bitmap and a type bitmap, wherein the extends bitmap and type bitmap for each stride block encode sparse and dense format distinctions for stride blocks accessed via branch pointers included in the branch table.

34. The method of claim 33, wherein the sparse compression format includes a value array corresponding to values for address bits used to access the stride block, and wherein the dense compression format includes bitmaps corresponding to the address bits, wherein a quantity of memory required to store the stride block in the sparse compression format is less than a quantity of memory required to store the stride block in a dense compression format.

35. A method for packet routing, comprising:
   receiving a packet that includes an address;
   fetching a first stride block, wherein the first stride block encodes a first portion of a longest prefix match trie, wherein the first stride block is one of a sparse stride block and a dense stride block, wherein sparse stride blocks encode portions of the longest prefix match trie that include no more than a first number of nodes, wherein dense stride blocks encode portions of the longest prefix match trie that include more than the first number of nodes;
   comparing a first portion of the address with a first portion of the first stride block to determine if a forwarding decision for the packet is resolved by the first stride block;
   when the forwarding decision is resolved by the first stride block, determining the forwarding decision for the packet;
   when the forwarding decision for the packet is not resolved by the first stride block:
      determining a second stride block based on the first portion of the address and a second portion of the first stride block; and
      processing the second stride block and any subsequent stride blocks determined until the forwarding decision is determined, wherein processing a stride block includes fetching the stride block and comparing a portion of the address with a portion of the stride block to determine one of the forwarding decision and a subsequent stride block for processing; and
   forwarding the packet based on the forwarding decision.

36. The method of claim 35, wherein when the first stride block is a dense stride block, comparing a first portion of the address with the portion of the first stride block further comprises:
   selecting a stride record of a plurality of stride records included in the first stride block using a first set of bits in the first portion of the address, wherein each stride record of the plurality of stride records encodes a portion of nodes encoded by the first stride block; and
   comparing a second set of bits in the first portion of the address with a portion of the stride record to determine if the forwarding decision is resolved by the first stride block.

* * * * *